United States Patent
Zheng et al.

(10) Patent No.: US 11,888,688 B2
(45) Date of Patent: Jan. 30, 2024

(54) CONFIGURATION INFORMATION SUBSCRIPTION METHOD AND APPARATUS

(71) Applicant: HUAWEI TECHNOLOGIES CO., LTD., Shenzhen (CN)

(72) Inventors: Guangying Zheng, Nanjing (CN); Bin Liu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/856,228

(22) Filed: Jul. 1, 2022

(65) Prior Publication Data

US 2022/0337479 A1 Oct. 20, 2022

Related U.S. Application Data

(63) Continuation of application No. PCT/CN2020/116170, filed on Sep. 18, 2020.

(30) Foreign Application Priority Data

Jan. 3, 2020 (CN) .......................... 202010006414.0

(51) Int. Cl.
*G06F 15/177* (2006.01)
*H04L 41/0813* (2022.01)
*H04L 41/0893* (2022.01)
(Continued)

(52) U.S. Cl.
CPC ........ *H04L 41/0813* (2013.01); *H04L 41/082* (2013.01); *H04L 41/0806* (2013.01); *H04L 41/0893* (2013.01)

(58) Field of Classification Search
CPC .................................................... H04L 41/082
See application file for complete search history.

(56) References Cited

U.S. PATENT DOCUMENTS

| | | | |
|---|---|---|---|
| 8,635,373 B1 * | 1/2014 | Supramaniam | ......... H04L 67/01 |
| | | | 709/248 |
| 2010/0257043 A1 | 10/2010 | Kassaei et al. | |
| 2021/0064389 A1 * | 3/2021 | Ackermann | ........ G06F 9/30145 |

FOREIGN PATENT DOCUMENTS

| | | |
|---|---|---|
| CN | 101335634 A | 12/2008 |
| CN | 102546554 A | 7/2012 |

(Continued)

OTHER PUBLICATIONS

A. Clemm et al, Subscription to YANG Notifications for Datastore Updates, rfc 8641, Sep. 2019, 58 Pages.
E. Voit et al, Subscription to YANG Notifications, RFC 8639, Sep. 2019, 77 Pages.
(Continued)

*Primary Examiner* — Wing F Chan
*Assistant Examiner* — Joseph R Maniwang
(74) *Attorney, Agent, or Firm* — HAUPTMAN HAM, LLP

(57) ABSTRACT

This application discloses a configuration information subscription method and apparatus. The method includes: a client obtains a subscription request message, where the subscription request message includes first indication information and second indication information, the first indication information is for indicating subscribed first configuration information, and the second indication information is for indicating subscribed second configuration information associated with the first configuration information; and sends the subscription request message to a server. According to the solution in this application, when subscribing to the first configuration information, the client can subscribe to the second configuration information through association, so that subscription efficiency of the configuration information is improved.

15 Claims, 5 Drawing Sheets

(51) Int. Cl.
  *H04L 41/0806* (2022.01)
  *H04L 41/082* (2022.01)

(56) References Cited

FOREIGN PATENT DOCUMENTS

| CN | 105099761 A | 11/2015 |
|---|---|---|
| CN | 108347347 A | 7/2018 |
| CN | 110532023 A | 12/2019 |
| EP | 3145148 A1 | 3/2017 |
| WO | 2015117417 A1 | 8/2015 |
| WO | 2018001475 A1 | 1/2018 |

OTHER PUBLICATIONS

M. Bjorklund , A YANG Data Model for Interface Management, RFC 8343, Mar. 2018, 49 Pages.

Martin Bjorklund ,Re: [netconf] leafrefed data item in YANG Push, https://mailarchive.ietf.org/arch/msg/netconf/Lp6yLP66XWxQPRghaRpYqJdXUtl/, Dec. 16, 2019, 2 pages.

M. Jethanandani et al , YANG Data Model for Network Access Control Lists (ACLs), RFC 8519, Mar. 2019, 60 Pages.

International Search Report issued in corresponding International Application No. PCT/CN2020/116170, dated Dec. 16, 2020, pp. 1-9.

Extended European Search Report issued in corresponding European Application No. 20910255.7, dated Dec. 19, 2022, pp. 1-8.

C1-070158, CableLabs, Work Item Request: IMS Protocol Enhancements for Cable Client Types and Deployment Models, 3GPP TSG CT WG1 Meeting #45, Vancouver, Canada: Feb. 5-9, 2007, 3 pages.

\* cited by examiner

CONFIGURATION INFORMATION SUBSCRIPTION METHOD AND APPARATUS

CROSS-REFERENCE TO RELATED APPLICATIONS

This application is a continuation of International Application No. PCT/CN2020/116170, filed on Sep. 18, 2020, which claims priority to Chinese Patent Application No. 202010006414.0, filed on Jan. 3, 2020. The disclosures of the aforementioned applications are hereby incorporated by reference in their entireties.

TECHNICAL FIELD

This application relates to the field of internet technologies, in particular, to the field of network operation and maintenance management, and specifically, to a configuration information subscription method and apparatus.

BACKGROUND

A software defined network (SDN) is a new innovative network architecture, and is an implementation of network virtualization. In the SDN, a network is configured according to the network configuration protocol NETCONF). During network configuration, a plurality of clients simultaneously perform service configuration management on a node device (which is referred to as a "node" for short below) in the network. For example, basic resource-type configurations, such as interface configurations, are modified by the plurality of clients.

In a NETCONF protocol architecture, there are usually associations between nodes, between a node and a node instance, and between node instances. After a client modifies a configuration of a node or a node instance, another client needs to subscribe to configuration change information and an associated configuration of the client in real time. For example, after an element management system (EMS) modifies a configuration, a software defined network controller (SDN controller) needs to subscribe to configuration change information and an associated configuration of the EMS in real time. Similarly, the EMS may also subscribe to configuration change information and an associated configuration of the software defined network controller.

However, in an existing subscription method, a client can only subscribe to configuration information of all node instances in a network as a whole, and then extract required configuration information of a node instance from the subscribed configuration information. In this way, the client obtains configuration information of many node instances that the client is unconcerned about. Consequently, subscription efficiency is low.

SUMMARY

This application provides a configuration information subscription method and apparatus, to improve subscription efficiency of a network device for configuration information.

According to a first aspect, a configuration information subscription method is provided. The method includes: A client obtains a subscription request message, where the subscription request message includes first indication information and second indication information, the first indication information is for indicating subscribed first configuration information, and the second indication information is for indicating subscribed second configuration information associated with the first configuration information. The client sends the subscription request message to a server. In this aspect, when subscribing to the first configuration information, the client can subscribe to the second configuration information through association, so that subscription efficiency of the configuration information is improved.

In an implementation, the method further includes: The client receives a first subscription notification message sent by the server, where the first subscription notification message includes the first configuration information and the second configuration information.

In another implementation, the first configuration information includes configuration information of an instance of a first node, and the second configuration information includes configuration information of an instance of a second node associated with the first node. In this implementation, in a YANG model of the first node, the second node may be associated with the first node. In this case, when subscribing to the configuration information of the instance of the first node, the client can also subscribe to the configuration information of the instance of the second node associated with the first node, so that the subscription efficiency is improved.

In another implementation, the configuration information of the instance of the first node is configuration information obtained after a configuration of an instance of the first node changes, and that a configuration of an instance of the first node changes includes: an attribute value of the instance of the first node changes, an instance of the first node is added, or an instance of the first node is deleted. In this implementation, a scenario of associated subscription is that the configuration of the instance of the first node changes. For example, the attribute value of the instance of the first node changes, the instance of the first node is added, or the instance of the first node is deleted. In this case, when subscribing to the configuration information of the instance of the first node, the client can also subscribe to the configuration information of the instance of the second node associated with the first node, so that the subscription efficiency is improved.

In another implementation, the configuration information of the instance of the second node associated with the first node is configuration information obtained after the instance of the second node satisfies a first constraint condition and a configuration of an instance of the second node changes, and that a configuration of an instance of the second node changes includes: an attribute value of the instance of the second node changes, an instance of the second node is added, or an instance of the second node is deleted. In this implementation, a scenario of associated subscription is that the instance of the second node satisfies the first constraint condition (for example, require-instance being false exists in a model of the instance of the second node), and the configuration of the instance of the second node changes. In this case, when subscribing to the configuration information of the instance of the first node, the client can also subscribe to the configuration information of the instance of the second node associated with the first node, so that the subscription efficiency is improved.

In another implementation, if a YANG model of the first node describes that the second node is of a leafref type, the subscription request message includes a leaf-ref-sub field, to subscribe to the configuration information of the instance of the second node associated with the first node, where if the leaf-ref-sub field is for indicating target field information of the second configuration information, the first subscription notification message includes a target field in the second configuration information; and/or if the leaf-ref-sub field is for indicating to subscribe to second configuration information of a target node instance, the first subscription notification message includes the second configuration information of the target node instance. In this implementation, the subscription request message may include the target field information of the second configuration information, or may indicate to subscribe to the second configuration information of the target node instance, so that configuration information subscription may be performed in a targeted manner.

In another implementation, the method further includes: receiving a subscription response message sent by the server, where the subscription response message is for indicating whether subscription succeeds or fails.

In another implementation, the subscription response message further includes initial first configuration information and initial second configuration information.

In another implementation, before the client receives the first subscription notification message sent by the server, the method further includes: The client receives a second subscription notification message sent by the server, where the second subscription notification message includes the initial first configuration information and the initial second configuration information. The initial first configuration information mentioned in this embodiment of this application is first configuration information obtained by the server based on the first indication information after the server receives the subscription request message from the client. The initial second configuration information mentioned in this embodiment of this application is second configuration information obtained by the server based on the second indication information after the server receives the subscription request message from the client.

According to a second aspect, a configuration information subscription method is provided. The method includes: A server generates a first subscription notification message, where the first subscription notification message includes first configuration information and second configuration information, and the second configuration information is associated with the first configuration information. The server sends the first subscription notification message to a client. In this aspect, the server sends the first subscription notification message to the client, so that when obtaining the subscribed first configuration information, the client can also obtain the second configuration information that is subscribed to through association. Therefore, subscription efficiency of the configuration information is improved.

In an implementation, the method further includes: The server receives a subscription request message from the client, where the subscription request message includes first indication information and second indication information, the first indication information is for indicating the subscribed first configuration information, and the second indication information is for indicating the subscribed second configuration information associated with the first configuration information.

In another implementation, before the server generates the first subscription notification message, the method further includes: The server obtains the first configuration information and the second configuration information, where the first configuration information includes configuration information of an instance of a first node, the configuration information of the instance of the first node is configuration information obtained after a configuration of an instance of the first node changes, the second configuration information includes configuration information of an instance of a second node associated with the first node, and that a configuration of an instance of the first node changes includes: an attribute value of the instance of the first node changes, an instance of the first node is added, or an instance of the first node is deleted.

In another implementation, before the server generates the first subscription notification message, the method further includes: The server obtains the first configuration information and the second configuration information, where the first configuration information includes configuration information of an instance of a first node, the second configuration information includes configuration information of an instance of a second node associated with the first node, the configuration information of the instance of the second node associated with the first node is configuration information obtained after the instance of the second node satisfies a first constraint condition and a configuration of an instance of the second node changes, and that a configuration of an instance of the second node changes includes: an attribute value of the instance of the second node changes, an instance of the second node is added, or an instance of the second node is deleted.

In another implementation, if a YANG model of the first node describes that the second node is of a leafref type, the subscription request message includes a leaf-ref-sub field, to subscribe to the configuration information of the instance of the second node associated with the first node, where if the leaf-ref-sub field is for indicating target field information of the second configuration information, the first subscription notification message includes a target field in the second configuration information; and/or if the leaf-ref-sub field is for indicating to subscribe to second configuration information of a target node instance, the first subscription notification message includes the second configuration information of the target node instance.

In another implementation, after the server receives the subscription request message from the client, the method further includes: The server sends a subscription response message to the client, where the subscription response message is for indicating whether subscription succeeds or fails.

In another implementation, the subscription response message further includes initial first configuration information and initial second configuration information.

In another implementation, the subscription notification message further includes the initial first configuration information and the initial second configuration information.

According to a third aspect, a configuration information subscription apparatus is provided. The apparatus includes: an obtaining unit, configured to obtain a subscription request message, where the subscription request message includes first indication information and second indication information, the first indication information is for indicating subscribed first configuration information, and the second indication information is for indicating subscribed second configuration information associated with the first configuration information; and a transceiver unit, configured to send the subscription request message to a server.

In an implementation, the transceiver unit is further configured to receive a first subscription notification message sent by the server, where the first subscription notification message includes the first configuration information and the second configuration information.

In another implementation, the first configuration information includes configuration information of an instance of a first node, and the second configuration information includes configuration information of an instance of a second node associated with the first node.

In another implementation, the configuration information of the instance of the first node is configuration information obtained after a configuration of an instance of the first node changes, and that a configuration of an instance of the first node changes includes: an attribute value of the instance of the first node changes, an instance of the first node is added, or an instance of the first node is deleted.

In another implementation, the configuration information of the instance of the second node associated with the first node is configuration information obtained after the instance of the second node satisfies a first constraint condition and a configuration of an instance of the second node changes, and that a configuration of an instance of the second node changes includes: an attribute value of the instance of the second node changes, an instance of the second node is added, or an instance of the second node is deleted.

In another implementation, if a YANG model of the first node describes that the second node is of a leafref type, the subscription request message includes a leaf-ref-sub field, to subscribe to the configuration information of the instance of the second node associated with the first node, where if the leaf-ref-sub field is for indicating target field information of the second configuration information, the first subscription notification message includes a target field in the second configuration information; and/or if the leaf-ref-sub field is for indicating to subscribe to second configuration information of a target node instance, the first subscription notification message includes the second configuration information of the target node instance.

In another implementation, the transceiver unit is further configured to receive a subscription response message sent by the server, where the subscription response message is for indicating whether subscription succeeds or fails.

In another implementation, the subscription response message further includes initial first configuration information and initial second configuration information.

In another implementation, before the transceiver unit receives the first subscription notification message from the server, the transceiver unit is further configured to receive a second subscription notification message sent by the server, where the second subscription notification message further includes the initial first configuration information and the initial second configuration information.

According to a fourth aspect, a configuration information subscription apparatus is provided. The apparatus includes: a generation unit, configured to generate a first subscription notification message, where the first subscription notification message includes first configuration information and second configuration information, and the second configuration information is associated with the first configuration information; and a transceiver unit, configured to send the first subscription notification message to a client.

In an implementation, the transceiver unit is further configured to receive a subscription request message from the client, where the subscription request message includes first indication information and second indication information, the first indication information is for indicating the subscribed first configuration information, and the second indication information is for indicating the subscribed second configuration information associated with the first configuration information.

In another implementation, the apparatus further includes a first obtaining unit, configured to obtain the first configuration information and the second configuration information, where the first configuration information includes configuration information of an instance of a first node, the configuration information of the instance of the first node is configuration information obtained after a configuration of an instance of the first node changes, the second configuration information includes configuration information of an instance of a second node associated with the first node, and that a configuration of an instance of the first node changes includes: an attribute value of the instance of the first node changes, an instance of the first node is added, or an instance of the first node is deleted.

In another implementation, the apparatus further includes a second obtaining unit, configured to obtain the first configuration information and the second configuration information, where the first configuration information includes configuration information of an instance of a first node, the second configuration information includes configuration information of an instance of a second node associated with the first node, the configuration information of the instance of the second node associated with the first node is configuration information obtained after the instance of the second node satisfies a first constraint condition and a configuration of an instance of the second node changes, and that a configuration of an instance of the second node changes includes: an attribute value of the instance of the second node changes, an instance of the second node is added, or an instance of the second node is deleted.

In another implementation, if a YANG model of the first node describes that the second node is of a leafref type, the subscription request message includes a leaf-ref-sub field, to subscribe to the configuration information of the instance of the second node associated with the first node, where if the leaf-ref-sub field is for indicating target field information of the second configuration information, the first subscription notification message includes a target field in the second configuration information; and/or if the leaf-ref-sub field is for indicating to subscribe to second configuration information of a target node instance, the first subscription notification message includes the second configuration information of the target node instance.

In another implementation, the transceiver unit is further configured to send a subscription response message to the client, where the subscription response message is for indicating whether subscription succeeds or fails.

In another implementation, the subscription response message further includes initial first configuration information and initial second configuration information.

In another implementation, the generation unit is further configured to generate a second subscription notification message, where the second subscription notification message includes the initial first configuration information and the initial second configuration information.

According to a fifth aspect, a configuration information subscription apparatus is provided. The apparatus includes a processor and a communication interface. The processor is configured to perform the method provided in any one of the first aspect or the implementations of the first aspect.

According to a sixth aspect, a configuration information subscription apparatus is provided. The apparatus includes a processor and a communication interface. The processor is configured to perform the method provided in any one of the second aspect or the implementations of the second aspect.

According to a seventh aspect, a computer-readable storage medium is provided. The computer-readable storage medium stores instructions. When the instructions are run on a computer, the computer is enabled to perform the methods according to the foregoing aspects.

According to an eighth aspect, a computer program product including instructions is provided. When the computer program product runs on a computer, the computer is enabled to perform the methods according to the foregoing aspects.

According to a ninth aspect, a network operation and maintenance management system is provided. The system includes the configuration information subscription apparatus provided in the third aspect or the fourth aspect, and the configuration information subscription apparatus provided in the fifth aspect or the sixth aspect.

DETAILED DESCRIPTION OF EMBODIMENTS

The following describes several concepts that may be used in embodiments of this application.

NETCONF provides a network device management mechanism. Users may use the mechanism to add, modify, and delete configurations of network devices, and obtain configuration and status information of the network devices. Based on the NETCONF protocol, the network devices may provide standard application programming interfaces (APIs), so that applications may send configurations to and obtain configurations from the network devices by directly using these APIs. NETCONF is based on the extensible markup language (XML). Therefore, all NETCONF-related configuration data and protocol messages are represented by using the XML. The XML language can express complex and modeled managed objects that have internal logical relationships, for example, ports, protocols, services, and their relationships. This improves operation efficiency and is suitable for large-scale and complex device management.

YANG emerges with NETCONF. YANG is a data modeling language used to describe data models of NETCONF-related network configurations and network statuses. YANG itself is not a data model, but a language for defining data models. A model established by using the YANG language is referred to as a YANG model for short.

NETCONF and YANG aim to implement network configuration automation in a programmable manner, and therefore simplify and accelerate deployment of network devices and services and reduce costs for network operators and enterprise users.

Figure 1:
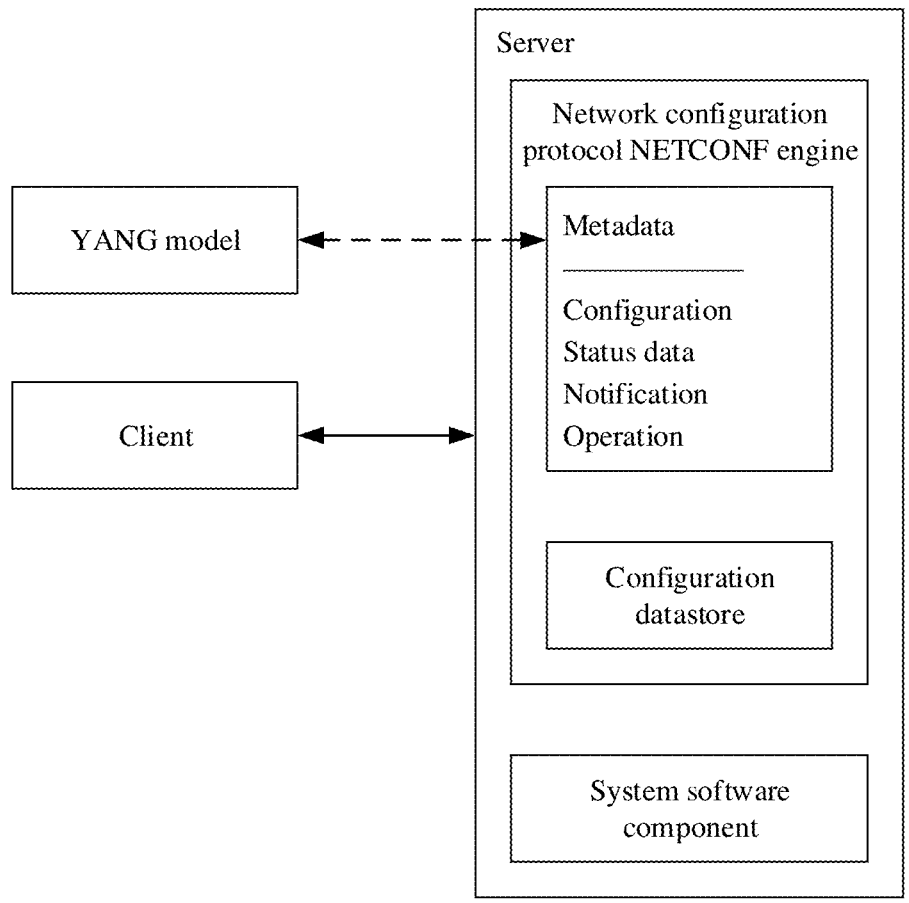
FIG. 1 is a schematic diagram of an architecture of NETCONF.

FIG. 1 is a schematic diagram of an architecture of NETCONF. NETCONF uses a client/server architecture. A client and a server establish a session according to a connection-oriented transport protocol. The server is a network device to be configured. In addition to hardware, a NETCONF engine is a software module that establishes the session with the client. Certainly, a software system of the server also runs on the server. Configuration data is maintained by the NETCONF engine and transferred to the software system of the server, and is finally used in a chip of the hardware.

The client subscribes to configuration information from the server. The configuration data refers to data that is configured by a user on the server in a specific manner. The configuration data itself may also exist in a plurality of datastores. For example, a<running/>datastore is used to save a currently effective configuration, a<candidate/>datastore is used to save data that can be committed for taking effect, and a<startup/>datastore is used to save configuration data during startup. When a configuration of a node or a node instance in a system changes, the server generates a subscription notification message, converts the subscription notification message into a message with a format that can be identified by the client, and sends the message to the client. A syntax structure of the configuration data is described by using a data model defined by the YANG language, where the data model includes a data type and a data structure.

Hello message

<hello> is merely used for capability exchange between a server and a client when a session is just established.

After the session is established, the server and the client need to send <hello>messages to each other. The <hello>messages carry capabilities and NETCONF protocol version numbers that are supported by the server and the client. The server and the client negotiate a to-be-used NETCONF version based on capability information of the server and the client. Generally, after the server and the client send the <hello>messages to each other and the version negotiation succeeds, it is considered that the NETCONF session is successfully established.

The NETCONF protocol defines a message layer, where the message layer includes a remote procedure call (RPC) message, a remote procedure call reply (rpc-reply) message, and an asynchronous notification.

1. RPC messages include rpc and rpc-reply. <rpc> is a message initiated by a client and sent to a server, and is used by the client to request the server to perform a specific operation.

<rpc>includes a mandatory attribute "message-id", where the id is a monotonically increasing positive integer and cannot be repeated in a session. The id is used for pairing of <rpc> and <rpc-reply>.

<rpc-reply> is an RPC response sent by the server to the client. The server cannot actively initiate <rpc-reply>, but can only reply with <rpc-reply>after receiving <rpc>, where <rpc-reply>needs to carry the same message-id as the received rpc.

Two default elements are defined in <rpc-reply>, where the elements are <ok> and <rpc-error>. <ok>indicates that RPC is successfully performed, but <rpc-error>indicates that RPC fails to be performed.

2. Notification indicates a meaning of a notification. NETCONF uses a subscription and release mechanism for notification. A server only sends a notification to a client that has sent a subscription request.

Generally, the client and the server obtain and modify configuration information according to the following steps:

The client and the server establish a connection-oriented transport protocol session.

The client and the server negotiate, by using hello messages, a capability supported by both the client and the server. For example, the client and the server both support the most advanced NETCONF version. Therefore, ambiguity during parsing is avoided.

The client sends a subscription request (<rpc>) to the server.

The server receives and parses the subscription request.

The server verifies validity of the RPC request based on a definition of a YANG data model.

The server executes the RPC request.

An execution result is returned to the client as a response message (<rpc-reply>).

The client receives and parses the response message.

It can be learned that a user can implement a requirement of customized configuration of a remote network device by using any programming language, and what the user does is to establish a session connection to a server, encapsulate and send a request message, and receive and parse a message. It is important that the user can implement service logic of the user through this simple interaction mode. For example, the user can apply different configurations based on network load and a device status. This may be the connotation of programmable automatic configuration and also the goal of NETCONF and YANG designs.

Figure 2:
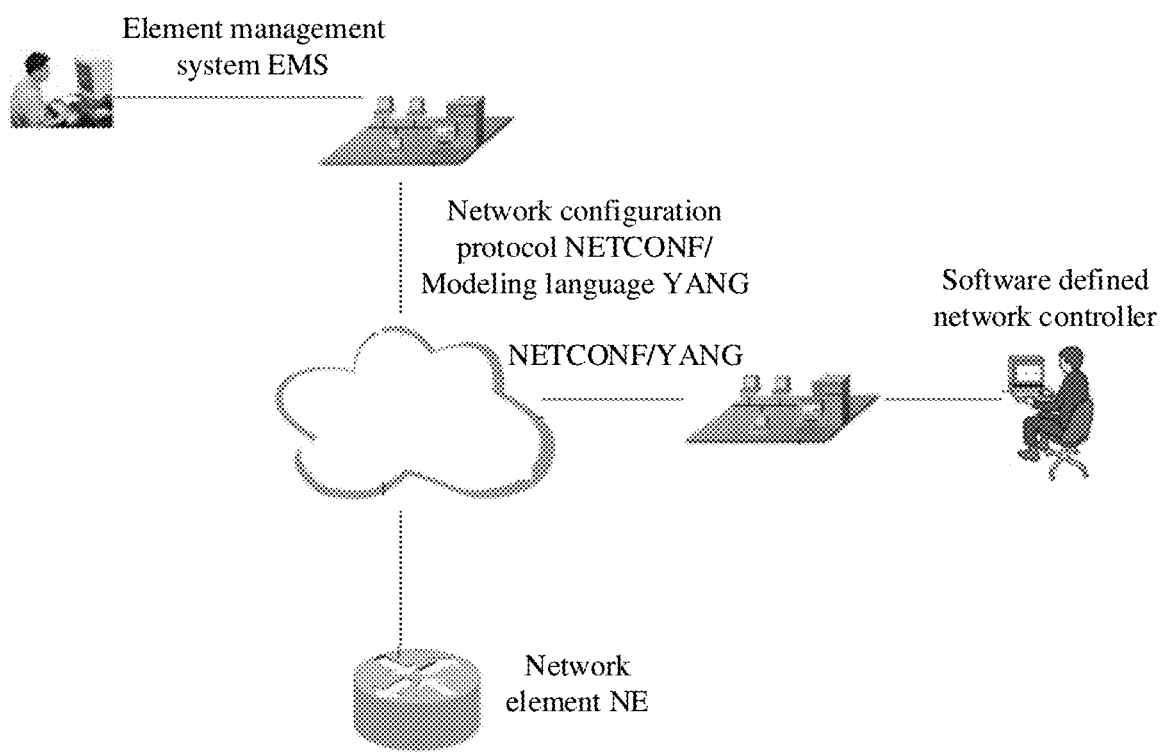
FIG. 2 is a schematic diagram of a specific example of an architecture of a network operation and maintenance management system.

FIG. 2 is a schematic diagram of a specific example of an architecture of a network operation and maintenance management system. An EMS and an SDN controller each may be used as a client. The EMS may subscribe to, from a network element (NE), configuration information of the SDN controller for a node or a node instance. The SDN controller may also subscribe to, from the NE, configuration information of the EMS for a node or a node instance, and save the configuration information in a controller datastore. A subscription request message, a subscription response message, and a subscription notification message between the client and a server are all described based on the NETCONF protocol by using YANG.

An embodiment of this application provides a configuration information subscription solution. When subscribing to first configuration information, a client can subscribe to second configuration information through association, so that subscription efficiency of the configuration information is improved.

Figure 3:
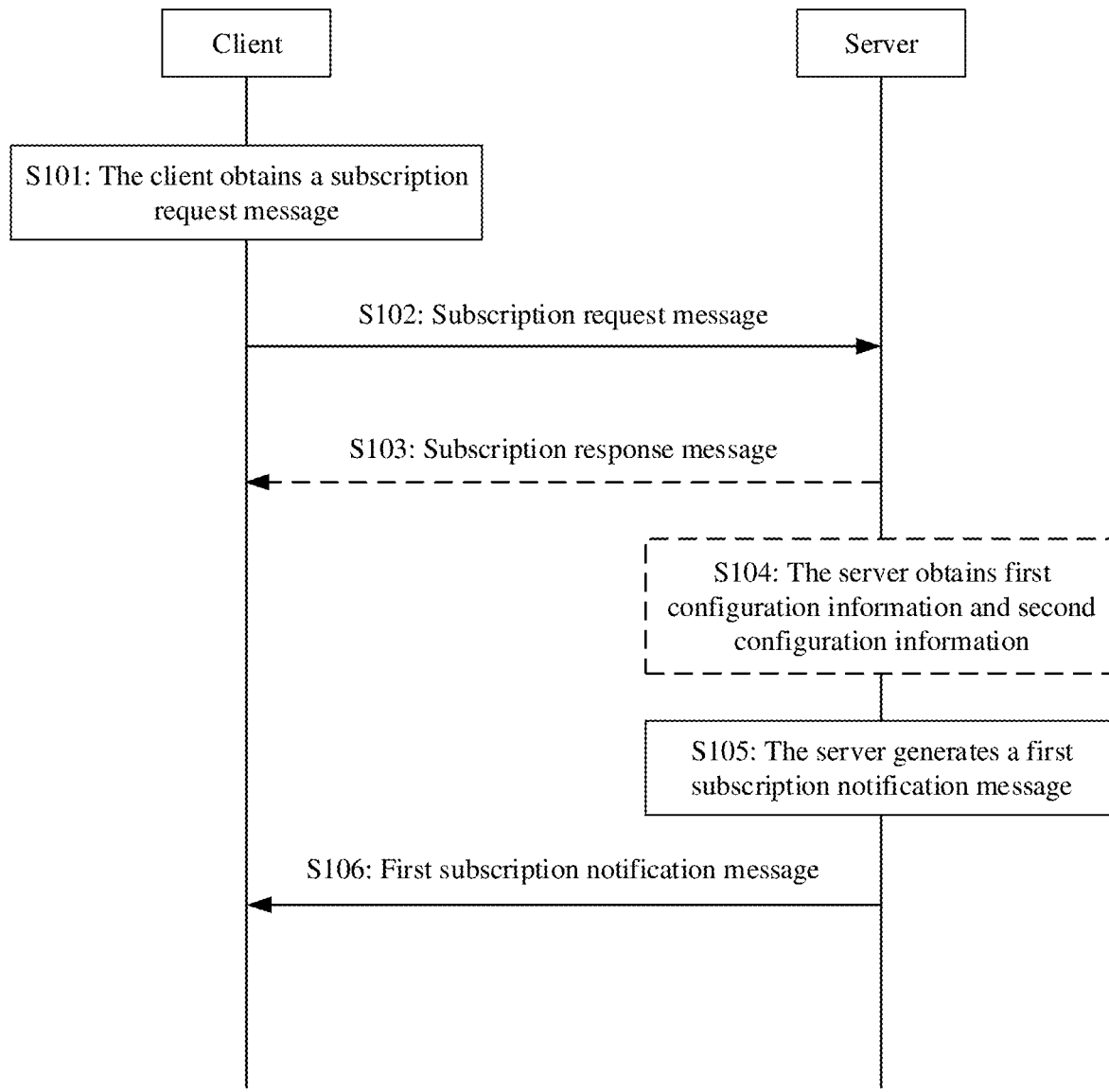
FIG. 3 is a schematic flowchart of a configuration information subscription method according to an embodiment of this application.

FIG. 3 is a schematic flowchart of a configuration information subscription method according to an embodiment of this application. The method may include the following steps.

S101: A client obtains a subscription request message.

The subscription request message may be sent by a user, or may be generated inside the client. The client may be, for example, the EMS or the SDN controller shown in FIG. 2. The client obtains the subscription request message, where the subscription request message includes first indication information and second indication information, the first indication information is for indicating subscribed first configuration information, and the second indication information is for indicating subscribed second configuration information associated with the first configuration information. In other words, when subscribing to the first configuration information, the client further requests to subscribe to the second configuration information associated with the first configuration information. Specifically, the subscription request message may be described by using the XML language.

In an implementation, a YANG model of a first node describes a second node associated with the first node. In this case, the first configuration information may include configuration information of an instance of the first node, and the second configuration information includes configuration information of an instance of the second node associated with the first node.

Further, the subscription request message further includes target field information of the second configuration information. To be specific, the client may request to subscribe to all or a part of fields of the second configuration information. Alternatively, the subscription request message is for indicating to subscribe to second configuration information of a target node instance. To be specific, the second node may include one or more node instances, and the client may request to subscribe to second configuration information of one or more target node instances of the second node. The subscription request message is for indicating to subscribe to the second configuration information of the target node instance and may further include target field information of the second configuration information of the target node instance, and the client may request to subscribe to a target field in the second configuration information of the one or more target node instances of the second node.

S102: The client sends the subscription request message to a server.

Correspondingly, the server receives the subscription request message.

The client and the server establish a session according to a connection-oriented transport protocol, and the client and the server negotiate, by using hello messages, a capability supported by both the client and the server. Therefore, the client may send the subscription request message to the server based on the transport protocol. The server receives the subscription request message, and parses the message to know that the client subscribes to the first configuration information and the second configuration information.

Specifically, if the YANG model of the first node describes that the second node is of a leafref type, the subscription request message includes a leaf-ref-sub field, to subscribe to the configuration information of the instance of the second node associated with the first node. The server may determine, based on a description of the YANG model of the first node and the leaf-ref-sub field in the subscription request message, that the client subscribes to the first configuration information and the second configuration information.

S103: The server sends a subscription response message to the client, where the subscription response message is for indicating whether subscription succeeds or fails.

Correspondingly, the client receives the subscription response message.

In an implementation, the subscription response message may further carry initial first configuration information and initial second configuration information. The initial first configuration information is relative to changed first configuration information, and the initial second configuration information is relative to changed second configuration information. The initial first configuration information/second configuration information refers to first configuration information/second configuration information obtained when the server receives a subscription request.

After receiving the initial first configuration information and the initial second configuration information, and subsequently receiving the changed first configuration information and/or the changed second configuration information, the client may obtain specific changed information content through analysis.

S104: The server obtains the first configuration information and the second configuration information.

This step is an optional step, and is represented by dashed lines in the figure. When the first configuration information changes, the server obtains the changed first configuration information and the unchanged second configuration information. When the second configuration information changes, the server obtains the unchanged first configuration information and the changed second configuration information. When both the first configuration information and the second configuration information change, the server obtains the changed first configuration information and the changed second configuration information.

As described above, the first configuration information may include the configuration information of the instance of the first node, and the second configuration information includes the configuration information of the instance of the second node associated with the first node.

In an implementation, the configuration information of the instance of the first node is configuration information obtained after a configuration of an instance of the first node changes, and that a configuration of an instance of the first node changes includes: an attribute value of the instance of the first node changes, an instance of the first node is added, or an instance of the first node is deleted. In other words, after the configuration of the instance of the first node changes, the server obtains the configuration information of the instance of the first node and the configuration information of the instance of the second node associated with the first node.

In another implementation, the configuration information of the instance of the second node associated with the first node is configuration information obtained after the instance of the second node satisfies a first constraint condition and a configuration of an instance of the second node changes, and that a configuration of an instance of the second node changes includes: an attribute value of the instance of the second node changes, an instance of the second node is added, or an instance of the second node is deleted. In other words, after the instance of the second node satisfies the first constraint condition and the configuration of the instance of the second node changes, the server obtains the configuration information of the instance of the first node and the configuration information of the instance of the second node associated with the first node.

S105: The server generates a first subscription notification message.

After obtaining the first configuration information and the second configuration information, the server generates the first subscription notification message. The first subscription notification message satisfies a transport protocol format requirement. For example, the first subscription notification message may be described by using the XML language. The first subscription notification message includes the first configuration information and the second configuration information, where the first configuration information is configuration information obtained based on the first indication information included in the subscription request message of the client, and the second configuration information is configuration information obtained based on the second indication information included in the subscription request message of the client.

Optionally, before S104, the server may further generate a second subscription notification message based on the obtained initial first configuration information and initial second configuration information, where the second subscription notification message may further carry the initial first configuration information and the initial second configuration information. For content of the initial first configuration information and the initial second configuration information, refer to corresponding content in S103. If the subscription response message carries the initial first configuration information/second configuration information, the second subscription notification message may be omitted.

S106: The server sends the first subscription notification message to the client.

Correspondingly, the client receives the first subscription notification message. The server may send the first subscription notification message to the client based on the transport protocol. The client receives the first subscription notification message, and obtains the first configuration information and the second configuration information that are included in the first subscription notification message. Therefore, when obtaining the first configuration information, the client can obtain the second configuration information associated with the first configuration information.

According to the configuration information subscription method provided in this embodiment of this application, when subscribing to the first configuration information, the client can subscribe to the second configuration information through association, so that subscription efficiency of the configuration information is improved.

In an implementation, the configuration information of the instance of the first node is the configuration information obtained after the configuration of the instance of the first node changes, and that the configuration of the instance of the first node changes includes: the attribute value of the instance of the first node changes, the instance of the first node is added, or the instance of the first node is deleted. The following provides detailed descriptions with reference to an example.

The first node and the second node are in models described by using YANG. An example in which an original node (the first node) is a YANG model of an access control list (ACL) and an associated node (the second node) is a YANG model of an interface (interfaces) is used to describe how to subscribe to configuration information of the associated node.

The original node, namely, the YANG model of the ACL, is as follows:

```
module: ietf-access-control-list
  +--rw acls
    +--rw attachment-points
      +--rw interface* [interface-id] {interface-attachment}?
        +--rw interface-id              if:interface-ref
        +--rw ingress
        |  +--rw acl-sets
        |    +--rw acl-set* [name]
        |      +--rw name                  -> /acls/acl/name
        |      +--ro ace-statistics* [name] {interface-stats}?
        |        +--ro name
        |        |                          -> /acls/acl/aces/ace/name
        |        +--ro matched-packets?     yang:counter64
        |        +--ro matched-octets?      yang:counter64
```

The YANG model of the ACL defines parameters of the ACL, including a definition of an interface (+--rw interface* [interface-id] {interface-attachment}? +--rw interface-id if:interface-ref). interface-id is a node identifier, and if:interface-ref is a type definition, where the type definition is actually leafref. leafref is a YANG data type indicating that a current node actually references or points to another node instance in a data tree. The leafref data type is used to form a mapping between associated configurations.

The associated node, namely, the YANG model of the interface described in an ACL model, is as follows:

```
module: ietf-interfaces
  +--rw interfaces
     +--rw interface* [name]
        +--rw name                         string
        +--rw description?                 string
        +--rw type                         identityref
        +--rw enabled?                     boolean
        +--rw link-up-down-trap-enable?    enumeration {if-mib}?
        +--ro admin-status                 enumeration {if-mib}?
        +--ro oper-status                  enumeration
```

The YANG model of the interface defines parameters of the interface.

The following describes how to subscribe to configuration information of an instance of the interface through association when a configuration of an instance of the ACL changes.

First, the client sends a subscription request message to the server. The subscription request message may be specifically a YANG-PUSH subscription. YANG-PUSH is a subscription mechanism for datastore changes. The client modifies a node configuration and stores the configuration in a datastore. The subscription request message carries a filtering type and required filtering result information. Filtering types include XML path language (xpath) filtering and subtree filtering. The two filtering types differ only in description manners and can be used to obtain same filtering result information.

Specifically, the following shows a description language for performing associated subscription. The description language for associated subscription is leaf-ref-sub. Therefore, the description language specifically refers to a YANG-PUSH subscription with leaf-ref-sub:

```
<netconf:rpc   message-id="101"
   xmlns:netconf="urn:ietf:params:xml:ns:netconf:base:1.0">
```

//rpc indicates that the client initiates a subscription request to the server, and message-id is an identifier for the client and the server to identify the subscription request message and a subscription response message that correspond to each other.

```
<establish-subscription
   xmlns="urn:ietf:params:xml:ns:yang:ietf-subscribed-notifications"
   xmlns:if="urn:ietf:params:xml:ns:yang:ietf-interfaces"
   xmlns:acl="urn:ietf:params:xml:ns:yang:ietf-access-control-list"
   xmlns:yp="urn:ietf:params:xml:ns:yang:ietf-yang-push">
   <yp:datastore>
      <yp:source   xmlns:ds="urn:ietf:params:xml:ns:yang:ietf-datastores">ds:running</yp:source>
      <yp:subtree-filter>
         <acl:acls>
            <acl:attachment-points>
               <acl:interface>
                  <acl:interface-id   leaf-ref-sub="/if:interfaces/if:interface?fields(name,type)"/>
                  <acl:ingress/>
               </acl:interface>
            </acl:attachment-points>
         </acl:acls>
      </yp:subtree-filter>
   </yp:datastore>
   <yp:periodic>
      <yp:period>500</yp:period>
   </yp:periodic>
</establish-subscription>
</netconf:rpc>
```

The description language for associated subscription describes that a subtree (subtree-filter): acls/attachment-points/interface in the ACL model (ietf-access-control-list) is subscribed to through establish-subscription (the content in bold).

The description language further describes that subscription to the configuration information of the instance of the interface model through association is specified in the subscription request message by using leaf-ref-sub. Further, selection of specific fields (for example, a name and a type) may be specified by carrying fields. That is, the filtering result information is acl:interface-id leaf-ref-sub="/if:interfaces/if:interface?fields(name,type)". It can be learned from the YANG model of the ACL that interface-id is of a leafref type. Therefore, the client may specify, only by including leaf-ref-sub after the interface-id field, that the configuration information of the associated node is subscribed to through association.

Further, a specific instance of the associated node may be specified by using an xpath predicate. For example, a description language for subscribing to an instance, of the interface, with a name "Ethernet1/0/0" is leaf-ref-sub=" /if:interfaces/if: interface[if: name='Ethernet1/0/0'.

Then, when receiving the subscription request message sent by the client, the server saves a YANG-PUSH original node (ACL model) subscription request (xmlns: acl=" urn: ietf: params:xml:ns:yang:ietf-access-control-list"), and saves an associated subscription request (acl:interface-id leaf-ref- sub="/if: interfaces/if: interface?fields (name, type)) of the subscription request.

When any operation causes a configuration change of the instance of the original node, for example, when an attribute value of the instance of the original subscription node changes, or an instance of the original node is added or deleted, the server reports, to the client according to a notification format, both configuration information of the original node and the configuration information of the instance of the associated node. If only a part of fields are selected in a leaf-ref-sub subscription, only information that corresponds to the part of fields and that is in the configuration information of the instance of the associated node may be reported. If a target instance is specified in the leaf-ref-sub subscription by using an xpath predicate, configuration information of the target instance of the associated node may be reported. Any operation may cause the configuration change of the original node. The operation may be performed by another client, or the configuration change may be caused due to interaction between the server and another network element.

Further, if continuous leafref relationships exist among a plurality of models, any nodes on a leafref chain may be subscribed to through association. For example, node A has a leafref relationship with node B, and node B has a leafref relationship with node C. In this case, when node A is subscribed to, node B or node C may be subscribed to through association, or both node B and node C may be subscribed to through association. Simultaneous subscription to a plurality of nodes on the leafref chain may be implemented based on xpath syntax, for example, by specifying leaf-ref-sub=' /if:interfaces/if:interface I/another-module: sample-node-C s/another-module: sample-nodeC'.

In another implementation, the configuration information of the instance of the second node associated with the first node is the configuration information obtained after the instance of the second node satisfies the first constraint condition and the configuration of the instance of the second node changes, and that the configuration of the instance of the second node changes includes: the attribute value of the instance of the second node changes, the instance of the second node is added, or the instance of the second node is deleted. The following provides detailed descriptions with reference to a specific example.

In this embodiment, that the instance of the second node satisfies the first constraint condition may be, for example, that require-instance being false exists in a model of the node instance for which associated subscription is requested to be performed. That require-instance being false exists in the model of the node instance for which associated subscription is requested to be performed may include the following scenarios: An instance is created in test-config/interfaces/interface and associated with a non-existent interface Eth-Trunk2. An instance is created in test-config/interfaces/interface and associated with an existent interface Eth-Trunk2, but Eth-Trunk2 is subsequently deleted by a client operation. An instance is created in test-config/interfaces/interface and associated with an existent interface Eth-Trunk2, but an attribute of Eth-Trunk2 is subsequently modified by a client operation. Certainly, the foregoing scenarios are merely examples. These are not limited in this embodiment of this application.

The following uses a specific example to describe how to perform associated subscription when require-instance being false exists in the model of the node instance for which associated subscription is requested to be performed.

A YANG model of an original node (example) is as follows:

```
module: example
    +--rw test-config
        +--rw interfaces*
            +--rw interface*
                +--rw intf-name
                +--rw other-data
leaf intf-name {
    type leafref {
        path "/if:interfaces/if:interface/if:name";
        require-instance "false";
    }
}
```

The model of the original node describes that require-instance being false exists in a model of an instance of an interface node that has a leafref relationship with the original node.

A specific associated subscription procedure is as follows:

First, the client sends a subscription request message to the server, where the subscription request message may be specifically a YANG-PUSH subscription. The subscription request message specifies that a filtering type is xpath filtering or subtree filtering.

Specifically, the following shows a description language for performing associated subscription for the node instance. The description language for associated subscription is leaf-ref-sub. Therefore, the description language specifically refers to a YANG-PUSH subscription with leaf-ref-sub:

```
<netconf:rpc                    message-id="101"
xmlns:netconf="urn:ietf:params:xml:ns:netconf:base:1.0">
    <establish-subscription xmlns="urn:ietf:params:xml:ns:yang:ietf-subscribed-
notifications"
        xmlns:if="urn:ietf:params:xml:ns:yang:ietf-interfaces"
xmlns:example="urn:ietf:params:xml:ns:yang:example"
        xmlns:yp="urn:ietf:params:xml:ns:yang:ietf-yang-push">
      <yp:datastore>
        <yp:source                xmlns:ds="urn:ietf:params:xml:ns:yang:ietf-
datastores">ds:running</yp:source>
        <yp:subtree-filter>
          <example:test-config>
            <example:interfaces>
              <example:interface>
                <example:interface         leaf-ref-
sub="/if:interfaces/if:interface?fields(name,type)"/>
                <example:other-data/>
              </example:interface>
            </example:interfaces>
          </example:test-config>
        </yp:subtree-filter>
      </yp:datastore>
      <yp:periodic>
        <yp:period>500</yp:period>
      </yp:periodic>
    </establish-subscription>
</netconf:rpc>
```

The description language for associated subscription describes that a subtree (subtree-filter): example:test-config/example:interfaces/example:interface in the example model is subscribed to through establish-subscription (the content in bold).

The description language further describes that subscription to configuration information of an interface model through association is specified in the subscription request message by using leaf-ref-sub. Further, selection of specific fields (for example, a name and a type) may be specified by carrying fields (fields). That is, filtering result information is example:interface leaf-ref-sub="/if:interfaces/if:interface?fields (name,type)". It can be learned from the YANG model of the example that interface-id is of a leafref type, and a constraint of require-instance being false exists in the model of the instance of the interface. Therefore, the client may specify, only by including leaf-ref-sub after the interface-id field, that the configuration information of the associated node is subscribed to through association.

Further, a specific instance of the associated node may be specified by using an xpath predicate. For example, a description language for subscribing to an instance, of the interface, with a name "Eth-Trunk2" is leaf-ref-sub=" /if: interfaces/if: interface[if: name=' Eth-Trunk2'].

Then, when receiving a subscription request sent by the client, the server saves a YANG-PUSH original node (example model) subscription request, and saves an associated subscription request of the subscription request.

When any operation causes a change of an instance of the associated node, for example, when an attribute value of the instance of the associated node changes, or an instance is added or deleted, the server reports, to the client, configuration information of an instance of the original node and configuration information of an instance of the associated node.

Specifically, in an example, when an instance is created in test-config/interfaces/interface and associated with a non-existent interface Eth-Trunk2, when Eth-Trunk2 is subsequently created by a client operation, because example: interface leaf-ref-sub="/if:interfaces/if:interface?fields (name,type)" is previously subscribed to through association, a name and a type of Eth-Trunk2 and all information in test-config/interfaces/interface are reported to the client.

In another example, when an instance is created in test-config/interfaces/interface and associated with an existent interface Eth-Trunk2, when Eth-Trunk2 is subsequently deleted by a client operation, because example:interface leaf-ref-sub="/if:interfaces/if:interface?fields (name,type)" is previously subscribed to through association, a name and a type of Eth-Trunk2 and all information in test-config/interfaces/interface are reported to the client.

In another example, when an instance is created in test-config/interfaces/interface and associated with an existent interface Eth-Trunk2, when an attribute of Eth-Trunk2 is subsequently modified by a client operation (for example, a description of the attribute is modified), because example: interface leaf-ref-sub="/if: interfaces/if: interfac e?fields (name, type)" is previously subscribed to through association, a name and a type of Eth-Trunk2 and all information in test-config/interfaces/interface are reported to the client.

Figure 4:
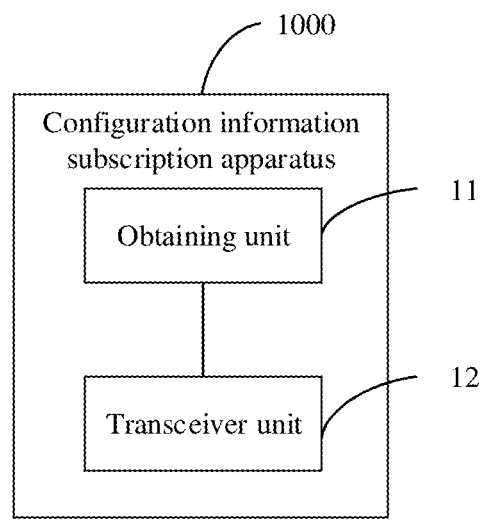
FIG. 4 is a schematic diagram of a structure of a configuration information subscription apparatus according to an embodiment of this application.

Based on a same concept as the configuration information subscription method, as shown in FIG. 4, an embodiment of this application further provides a configuration information subscription apparatus 1000. The subscription apparatus 1000 includes an obtaining unit 11 and a transceiver unit 12.

The obtaining unit 11 is configured to obtain a subscription request message, where the subscription request message includes first indication information and second indication information, the first indication information is for indicating subscribed first configuration information, and the second indication information is for indicating subscribed second configuration information associated with the first configuration information. The transceiver unit 12 is configured to send the subscription request message to a server.

In an implementation, the transceiver unit 12 is further configured to receive a first subscription notification message sent by the server, where the first subscription notification message includes the first configuration information and the second configuration information.

In another implementation, the first configuration information includes configuration information of an instance of a first node, and the second configuration information includes configuration information of an instance of a second node associated with the first node.

In another implementation, the configuration information of the instance of the first node is configuration information obtained after a configuration of an instance of the first node changes, and that a configuration of an instance of the first node changes includes: an attribute value of the instance of the first node changes, an instance of the first node is added, or an instance of the first node is deleted.

In another implementation, the configuration information of the instance of the second node associated with the first node is configuration information obtained after the instance of the second node satisfies a first constraint condition and a configuration of an instance of the second node changes, and that a configuration of an instance of the second node changes includes: an attribute value of the instance of the second node changes, an instance of the second node is added, or an instance of the second node is deleted.

In another implementation, if a YANG model of the first node describes that the second node is of a leafref type, the subscription request message includes a leaf-ref-sub field, to subscribe to the configuration information of the instance of the second node associated with the first node, where if the leaf-ref-sub field is further for indicating target field information of the second configuration information, the first subscription notification message includes a target field in the second configuration information; and/or if the leaf-ref-sub field is for indicating to subscribe to second configuration information of a target node instance, the first subscription notification message includes the second configuration information of the target node instance.

In another implementation, the transceiver unit 12 is further configured to receive a subscription response message sent by the server, where the subscription response message is for indicating whether subscription succeeds or fails.

In another implementation, the subscription response message further includes initial first configuration information and initial second configuration information.

In another implementation, the transceiver unit 12 is further configured to receive a second subscription notification message sent by the server, where the second subscription notification message includes the initial first configuration information and the initial second configuration information.

For specific implementation of the obtaining unit 11 and the transceiver unit 12, refer to related descriptions of the client in the method embodiment shown in FIG. 3.

Based on the configuration information subscription apparatus provided in this embodiment of this application, when subscribing to the first configuration information, the subscription apparatus can subscribe to the second configuration information through association, so that subscription efficiency of the configuration information is improved.

Figure 5:
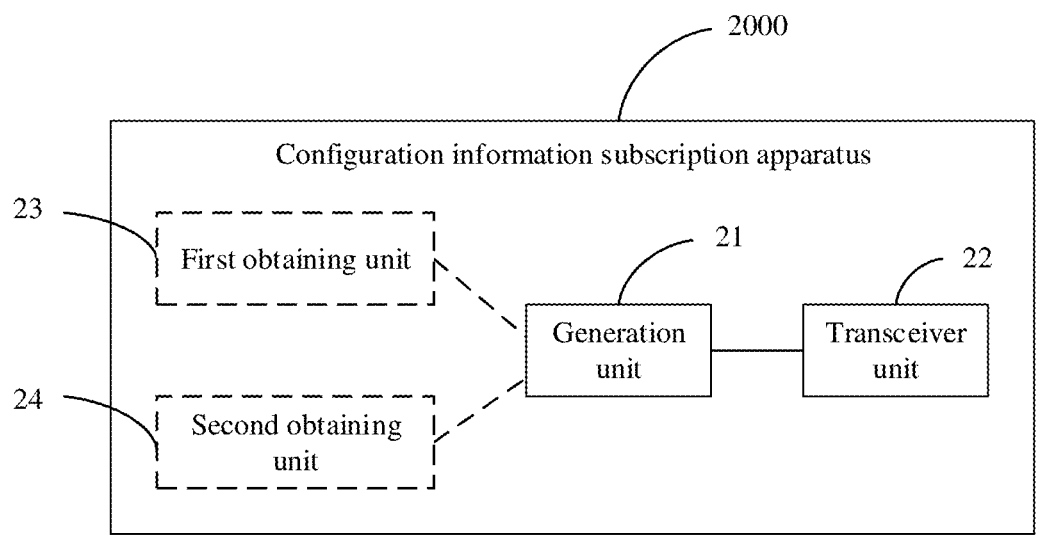
FIG. 5 is a schematic diagram of a structure of another configuration information subscription apparatus according to an embodiment of this application.

Based on a same concept as the configuration information subscription method, as shown in FIG. 5, an embodiment of this application further provides a configuration information subscription apparatus 2000. The subscription apparatus 2000 includes a generation unit 21 and a transceiver unit 22, and may further include a first obtaining unit 23 and a second obtaining unit 24 (which are represented by dashed lines in the figure).

The generation unit 21 is configured to generate a first subscription notification message, where the first subscription notification message includes first configuration information and second configuration information, the first configuration information is configuration information obtained based on first indication information included in a subscription request message of a client, and the second configuration information is configuration information obtained based on second indication information included in the subscription request message of the client. The transceiver unit 22 is configured to send the first subscription notification message to the client.

In an implementation, the transceiver unit 22 is further configured to receive the subscription request message from the client, where the subscription request message includes the first indication information and the second indication information, the first indication information is for indicating the subscribed first configuration information, and the second indication information is for indicating the subscribed second configuration information associated with the first configuration information.

In another implementation, the first obtaining unit 23 is configured to obtain the first configuration information and the second configuration information, where the first configuration information includes configuration information of an instance of a first node, the configuration information of the instance of the first node is configuration information obtained after a configuration of an instance of the first node changes, the second configuration information includes configuration information of an instance of a second node associated with the first node, and that a configuration of an instance of the first node changes includes: an attribute value of the instance of the first node changes, an instance of the first node is added, or an instance of the first node is deleted.

In another implementation, the second obtaining unit 24 is configured to obtain the first configuration information and the second configuration information, where the first configuration information includes configuration information of an instance of a first node, the second configuration information includes configuration information of an instance of a second node associated with the first node, the configuration information of the instance of the second node associated with the first node is configuration information obtained after the instance of the second node satisfies a first constraint condition and a configuration of an instance of the second node changes, and that a configuration of an instance of the second node changes includes: an attribute value of the instance of the second node changes, an instance of the second node is added, or an instance of the second node is deleted.

In another implementation, if a YANG model of the first node describes that the second node is of a leafref type, the subscription request message includes a leaf-ref-sub field, to subscribe to the configuration information of the instance of the second node associated with the first node, where if the subscription request message further includes target field information of the second configuration information, the first subscription notification message includes a target field in the second configuration information; and/or if the subscription request message is for indicating to subscribe to second configuration information of a target node instance, the first subscription notification message includes the second configuration information of the target node instance.

In another implementation, the transceiver unit 22 is further configured to send a subscription response message to the client, where the subscription response message is for indicating whether subscription succeeds or fails.

In another implementation, the subscription response message further includes initial first configuration information and initial second configuration information.

In another implementation, the generation unit 21 is configured to generate a second subscription notification message, where the second subscription notification message further includes the initial first configuration information and the initial second configuration information. The transceiver unit 22 is further configured to send the second subscription notification message to the client after sending the subscription response message.

For specific implementation of the generation unit 21, the transceiver unit 22, the first obtaining unit 23, and the second obtaining unit 24, refer to related descriptions of the server in the method embodiment shown in FIG. 3.

Based on the configuration information subscription apparatus provided in this embodiment of this application, the subscription apparatus sends the first subscription notification message to the client, so that when obtaining the subscribed first configuration information, the client can also obtain the second configuration information that is subscribed to through association. Therefore, subscription efficiency of the configuration information is improved.

Figure 6:
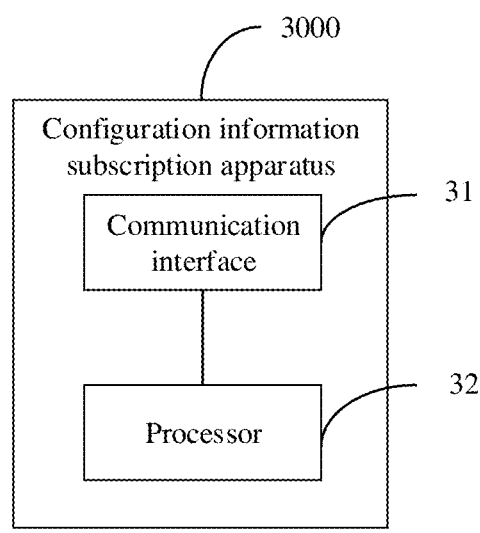
FIG. 6 is a schematic diagram of a structure of another configuration information subscription apparatus according to an embodiment of this application.

An embodiment of this application further provides a configuration information subscription apparatus. FIG. 6 is a schematic diagram of a structure of the configuration information subscription apparatus according to this embodiment of this application. The configuration information subscription apparatus 3000 includes a communication interface 31 and a processor 32. The communication interface 31 is configured to receive and send messages. The processor 32 is configured to perform the method steps performed by the client or the server in FIG. 3.

There may be one or more communication interfaces 31. The communication interface 31 may include a wireless interface and/or a wired interface. For example, the wireless interface may include a wireless local area network (WLAN) interface, a Bluetooth interface, a cellular network interface, or any combination thereof. The wired interface may include an Ethernet interface, an asynchronous transfer mode interface, a fiber channel interface, or any combination thereof. The Ethernet interface may be an electrical interface or an optical interface. The communication interface 31 does not necessarily include (although usually includes) the Ethernet interface.

There may be one or more processors 32. The processor 32 includes a central processing unit, a network processor, a graphics processing unit (GPU), an application-specific integrated circuit, a programmable logic device, or any combination thereof. The PLD may be a complex programmable logic device, a field programmable gate array, generic array logic, or any combination thereof.

The configuration information subscription apparatus 3000 may further include a memory, configured to store program instructions executed by the processor. The memory may include a volatile memory, for example, a random access memory (RAM). The memory may alternatively include a non-volatile memory, for example, a flash memory, a hard disk drive (HDD), or a solid-state drive (SSD). The memory may alternatively include a combination of the foregoing types of memories.

Based on the configuration information subscription apparatus provided in this embodiment of this application, when subscribing to first configuration information, the subscription apparatus can subscribe to second configuration information through association, so that subscription efficiency of the configuration information is improved.

A person skilled in the art may clearly understand that, for the purpose of convenient and brief description, for detailed working processes of the described systems, apparatuses, and units, refer to corresponding processes in the foregoing method embodiment. Details are not described herein again.

In the several embodiments provided in this application, it should be understood that the disclosed system, apparatus, and method may be implemented in other manners. For example, division into the units is merely logical function division and may be other division during actual implementation. For example, a plurality of units or components may be combined or integrated into another system, or some features may be ignored or not performed. The displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to embodiments of this application are completely or partially generated. The computer may be a general-purpose computer, a dedicated computer, a computer network, or another programmable apparatus. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a read-only memory (ROM); a random access memory (RAM); a magnetic medium, for example, a floppy disk, a hard disk, a magnetic tape, or a magnetic disk; an optical medium, for example, a digital versatile disc (DVD); or a semiconductor medium, for example, a solid state disk (SSD).

What is claimed is:

1. A configuration information subscription method, comprising:
obtaining, by a client, a subscription request message, wherein the subscription request message comprises first indication information and second indication information, the first indication information is for indicating subscribed first configuration information, and the second indication information is for indicating subscribed second configuration information associated with the first configuration information; and
sending, by the client, the subscription request message to a server;
wherein the first configuration information comprises configuration information of an instance of a first node, and the second configuration information comprises configuration information of an instance of a second node associated with the first node;

wherein the configuration information of the instance of the second node associated with the first node is configuration information obtained after the instance of the second node satisfies a first constraint condition and a configuration of an instance of the second node changes, and that a configuration of an instance of the second node changes comprises:

an attribute value of the instance of the second node changes, an instance of the second node is added, or an instance of the second node is deleted.

2. The method according to claim 1, wherein the method further comprises:

receiving, by the client, a subscription notification message sent by the server, wherein the subscription notification message comprises the first configuration information and the second configuration information.

3. The method according to claim 1, wherein the configuration information of the instance of the first node is configuration information obtained after a configuration of an instance of the first node changes, and that a configuration of an instance of the first node changes comprises:

an attribute value of the instance of the first node changes, an instance of the first node is added, or an instance of the first node is deleted.

4. A configuration information subscription method, comprising:

generating, by a server, a subscription notification message, wherein the subscription notification message comprises first configuration information and second configuration information, and the second configuration information is associated with the first configuration information; and sending, by the server, the subscription notification message to a client;

wherein before the generating, by a server, a subscription notification message, the method further comprises:

obtaining, by the server, the first configuration information and the second configuration information, wherein the first configuration information comprises configuration information of an instance of a first node, the second configuration information comprises configuration information of an instance of a second node associated with the first node, the configuration information of the instance of the second node associated with the first node is configuration information obtained after the instance of the second node satisfies a first constraint condition and a configuration of an instance of the second node changes, and that a configuration of an instance of the second node changes comprises:

an attribute value of the instance of the second node changes, an instance of the second node is added, or an instance of the second node is deleted.

5. The method according to claim 4, wherein the method further comprises:

receiving, by the server, a subscription request message from the client, wherein the subscription request message comprises first indication information and second indication information, the first indication information is for indicating the subscribed first configuration information, and the second indication information is for indicating the subscribed second configuration information.

6. The method according to claim 4, wherein before the generating, by a server, a subscription notification message, the method further comprises:

obtaining, by the server, the first configuration information and the second configuration information, wherein the first configuration information comprises configuration information of an instance of a first node, the configuration information of the instance of the first node is configuration information obtained after a configuration of an instance of the first node changes, the second configuration information comprises configuration information of an instance of a second node associated with the first node, and that a configuration of an instance of the first node changes comprises:

an attribute value of the instance of the first node changes, an instance of the first node is added, or an instance of the first node is deleted.

7. A configuration information subscription apparatus, comprising:

a processor configured to obtain a subscription request message, wherein the subscription request message comprises first indication information and second indication information, the first indication information indicates subscribed first configuration information, and the second indication information indicates subscribed second configuration information associated with the first configuration information; and a transceiver configured to send the subscription request message to a server;

wherein if a YANG model of the first node describes that the second node is of a leafref type, the subscription request message comprises a leaf-ref-sub field, to subscribe to the configuration information of the instance of the second node associated with the first node, wherein if the subscription request message further comprises target field information of the second configuration information, the subscription notification message comprises a target field in the second configuration information; or if the subscription request message is for indicating to subscribe to second configuration information of a target node instance, the subscription notification message comprises the second configuration information of the target node instance.

8. The apparatus according to claim 7, wherein the transceiver is further configured to receive a subscription notification message from the server, wherein the subscription notification message comprises the first configuration information and the second configuration information.

9. The apparatus according to claim 8, wherein the first configuration information comprises configuration information of an instance of a first node, and the second configuration information comprises configuration information of an instance of a second node associated with the first node.

10. The apparatus according to claim 9, wherein the configuration information of the instance of the first node is configuration information obtained after a configuration of an instance of the first node changes, and that a configuration of an instance of the first node changes comprises:

an attribute value of the instance of the first node changes, an instance of the first node is added, or an instance of the first node is deleted.

11. The apparatus according to claim 9, wherein the configuration information of the instance of the second node associated with the first node is configuration information obtained after the instance of the second node satisfies a first constraint condition and a configuration of an instance of the second node changes, and that a configuration of an instance of the second node changes comprises:

an attribute value of the instance of the second node changes, an instance of the second node is added, or an instance of the second node is deleted.

12. A configuration information subscription apparatus, comprising:
- a processor configured to generate a subscription notification message, wherein the subscription notification message comprises first configuration information and second configuration information, and the second configuration information is associated with the first configuration information; and
- a transceiver configured to send the subscription notification message to a client,
- wherein the processor is further configured to obtain the first configuration information and the second configuration information, wherein the first configuration information comprises configuration information of an instance of a first node, the second configuration information comprises configuration information of an instance of a second node associated with the first node, the configuration information of the instance of the second node associated with the first node is configuration information obtained after the instance of the second node satisfies a first constraint condition and a configuration of an instance of the second node changes, and that a configuration of an instance of the second node changes comprises:
  - an attribute value of the instance of the second node changes, an instance of the second node is added, or an instance of the second node is deleted.

13. The apparatus according to claim 12, wherein the transceiver is further configured to receive a subscription request message from the client, wherein the subscription request message comprises first indication information and second indication information, the first indication information indicates the subscribed first configuration information, and the second indication information indicates the subscribed second configuration information.

14. The apparatus according to claim 12, wherein the processor is further
- configured to obtain the first configuration information and the second configuration information, wherein the first configuration information comprises configuration information of an instance of a first node, the configuration information of the instance of the first node is configuration information obtained after a configuration of an instance of the first node changes, the second configuration information comprises configuration information of an instance of a second node associated with the first node, and that a configuration of an instance of the first node changes comprises:
- an attribute value of the instance of the first node changes, an instance of the first node is added, or an instance of the first node is deleted.

15. The apparatus according to claim 12, wherein if a YANG model of a first node describes that a second node is of a leafref type, the subscription request message comprises a leaf-ref-sub field, to subscribe to the configuration information of the instance of the second node associated with the first node, wherein
- if the subscription request message further comprises target field information of the second configuration information, the subscription notification message comprises a target field in the second configuration information; or
- if the subscription request message is for indicating to subscribe to second configuration information of a target node instance, the subscription notification message comprises the second configuration information of the target node instance.

* * * * *